Feb. 7, 1956  T. HEIL  2,733,951
CONVERTIBLE UTILITY TRAILER AND CAMP TENT
Filed July 3, 1953
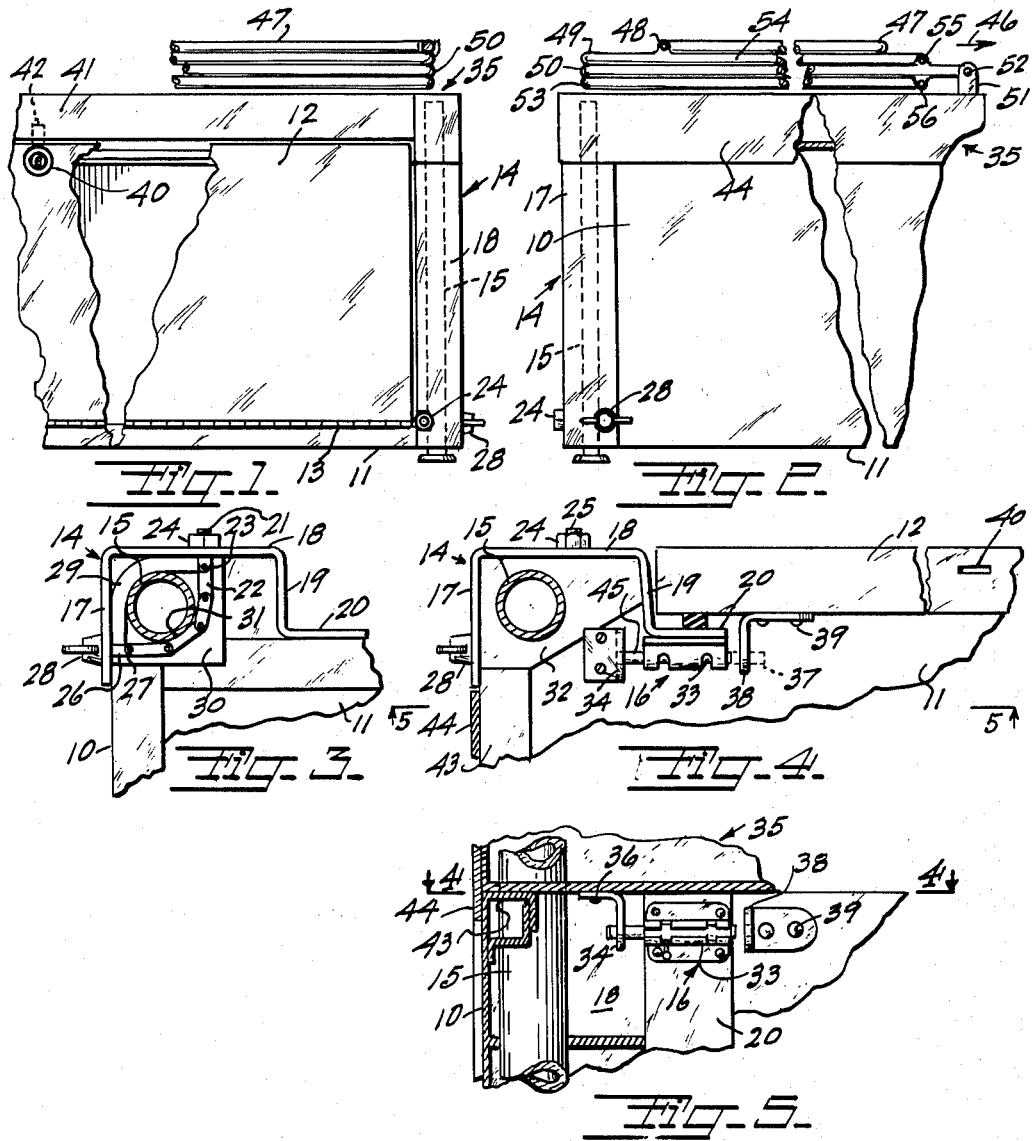
INVENTOR.
Theodore Heil
BY
Philip A. Friedus
Attorney

United States Patent Office 2,733,951
Patented Feb. 7, 1956

2,733,951
CONVERTIBLE UTILITY TRAILER AND CAMP TENT

Theodore Heil, Lodi, Calif.

Application July 3, 1953, Serial No. 365,971

4 Claims. (Cl. 296—23)

This invention relates to improvements in trailers and camp equipment, and particularly to a combination of trailer and tent elements which can be used selectively as a utility trailer or as a tent, with the utility trailer functioning as a storage space for food stuffs, hunting and fishing equipment, and luggage and as a support for the bed and one side of the tent, when the unit is used as a camp tent.

It also provides for support of the tent section by the end panels of the trailer, leaving the hinged side panels for use as tables, and further provides for selectively locking the tent section to the trailer body or locking the side panels in closed position, with a key operated lock provided for each side panel for locking the side panels closed when the tent section is applied to the trailer, guarding against theft.

This invention provides certain improvements over my Patents No. 2,383,192, issued August 21, 1945, and, No. 2,513,411, issued July 4, 1950, particularly with reference to the means for locking the tent unit to the trailer, and for locking the side panels closed in either case, whether the trailer is used alone as a utility trailer or is used in connection with the tent and bed section. It also provides an improved type of supports for the corners of the trailer.

The objects and advantages of the invention are as follows:

First, to provide a convertible utility and camp trailer and camp tent with improved interlocking means.

Second, to provide apparatus as outlined with selective securing means for securing the side panels of the trailer in closed position or for securing the tent apparatus to the trailer, and to provide additional locking means for locking the side panels in closed position when the tent apparatus is secured to the trailer.

Third, to provide apparatus as outlined with telescopic supports which selectively function as supports for the respective corners of the trailer and as transverse position maintaining means for the tent apparatus.

Fourth, to provide the telescopic supports with chain and screw type clamping means.

Fifth, to provide support for the tent apparatus limited to the end panels of the trailer.

In describing the invention reference will be had to the accompanying drawings, in which:

Fig. 1 is a fragmentary side elevation of one corner of the structure of the invention.

Fig. 2 is an end elevation of Fig. 1.

Fig. 3 is a bottom view of one corner of the trailer showing the chain and screw clamping means for the support leg which is shown in section.

Fig. 4 is a plan view on line 4—4 of Fig. 5 of one corner of the trailer showing the selective latching means for the trailer side panels and for the tent unit.

Fig. 5 is an inside view of the latching means and is taken on a line 5—5 of Fig. 4 and including a portion of the tent unit, to show the connection between the trailer and tent unit.

The invention consists of a trailer having fixed end walls 10, a bottom 11, and side panels 12 which are hinged at the lower ends to the bottom as indicated at 13.

Each corner of the trailer is provided with a special housing 14 which functions as a corner post, end frame for the side panel 12, telescopic housing for the leg 15, clamp member for the leg 15, and support for the selective latching means 16, and has an end wall 17, side wall 18, and a step with inturned wall 19 and bottom wall 20, being a combination of channel and angle form.

At the lower end is a clamping device for the leg 15, and consists of a threaded eye member 21 to which a chain 22 is secured as indicated at 23, and having a nut 24 adjustable on the threaded end 25 which extends through a passage in the side wall 18, the other end of the chain being secured to another threaded eye member 26 as indicated at 27 with the threaded end passing through a passage formed in the end wall 17 and provided with a thumb nut 28. A reinforcing plate 29 provides the necessary counterthrust for the chain, which is drawn tight to clamp the leg by tightening the thumb nut 28, thus any degree of adjustment of the selective legs at the four corners of the trailer can be made for leveling the trailer. A rubber diaphragm 30 having a passage 31 through which the leg is slidable, prevents ingress of dust, mud or water to the interior of the trailer.

A guide plate 32 for the leg is provided adjacent the upper end of this housing. A drawbolt 33 is mounted adjacent the upper end of the step 20, and when in one position shown in solid lines, engages in an eye 34 which is fixed to the underside of the tent and bed unit 35 as indicated at 36, thus locking the tent and bed unit to the trailer, while when in the other position indicated by the dotted lines 37, the tent and bed unit is free for removal and the hinged side panel 12 is locked closed through the insertion of the bolt in the eye 38 which is fixed to the inside of the side panel as indicated at 39. A key controlled lock 40 is provided for each hinged side panel with the lock cooperative with the underside of the side panel 41 of the tent and bed unit as indicated at 42.

A support stringer 43 is provided throughout the major portion of the width of the trailer at each end, extending from one corner frame to the other, and the tent and bed unit has a depending flange 44 to engage over this stringer at each end, these stringers beings the sole support for the tent and bed unit, so as to permit opening of the side panels at will, and which function as shelves or tables when camping.

As will be noted, for applying the tent and bed unit to the trailer, the hinged side panels of the trailer are released and opened. The tent and bed unit is then placed on the trailer, being supported at both ends. The drawbolt is then moved to the outward position indicated at 45 engaging in the eye 34 to lock the tent and bed unit to the trailer, there being one of these drawbolts at each corner.

As pointed out in the patents mentioned, the tent top folds over and within the tent and bed section when traveling, and the tent is quickly and easily erected merely by pulling outwardly in the direction of the arrow 46 on the bow 47 which is hinged at 48 to the bow 49, the main bow 50 being hinged at 51 to the trailer as indicated at 52 with the two secondary bows 53 and 54 being hinged to the main bow at 55 and 56.

Thus, upon arrival at the camping place, the thumb nuts 28 are loosened and the legs are dropped or drawn down to the supporting surface, and, for leveling, the respective corners of the trailer may be raised when necessary, and with the leg cooperating with the support, the thumb nut is tightened, providing a very efficient support against any load that may be expected.

The bow 47 is grabbed by its cross member and pulled to the right, viewing Fig. 2, which brings all of the other bows to their respective positions providing a side tent having the same area as that of the trailer. To keep the side panels closed it is necessary to lock them by means of the locks 49, therefore the interior of the trailer provides an efficiently locked enclosure for luggage, camp, hunting and fishing apparatus, and food stuffs, since the tent and bed unit cannot be removed or even raised without opening the side panels and drawing the draw bolts from the eyes 34.

The tent is almost as easily folded back except that it is necessary to properly arrange the cover material, and with the legs telescoped back into the housings and clamped, the device is ready for transport.

When the tent and bed unit is no longer required, the trailer can be used as a utility trailer by releasing the drawbolts and moving them to the position engaging and locking the side panels closed. The legs can also be removed if there is any objection to their projecting above the walls of the trailer.

I claim:

1. A convertible utility trailer and camp tent comprising, a trailer body having a floor and fixed end walls, corner housings, drop side walls hinged at their lower ends to said floor, a tent and bed unit having a floor and end walls and side walls with the end walls supportable on the end walls of said trailer body, first locking means on each of said corner housings cooperative with selective mating locking means on said floor of said tent and bed unit and with mating locking means on the respective ends of said side walls of said trailer body, and individual locking means for each of said side walls of said trailer body and cooperative with individual mating locking means on the side walls of said tent and bed unit, said first locking means comprising a draw bolt mounted on each corner housing and said selective mating locking means comprising a first eye member depending from the floor at each corner of said tent and bed unit for cooperation with one end of each draw bolt, and a second eye member projecting inwardly from the upper portion at each end of each of said drop side walls for cooperation with the other ends of said draw bolts, whereby release of the tent and bed unit for removal converts the first locking means to locking means for locking the drop side members in closed position for use of the trailer as a utility trailer.

2. A convertible utility trailer and camp tent comprising, a trailer body having a floor and fixed end walls, corner housings, drop side walls hinged at their lower ends to said floor, a tent and bed unit having a floor and end walls and side walls with the end walls supportable on the end walls of said trailer body, first locking means on each of said corner housings cooperative with selective mating locking means on said floor of said tent and bed unit and with mating locking means on the respective ends of said side walls of said trailer body, and individual locking means for each of said side walls of said trailer body and cooperative with individual mating locking means on the side walls of said tent and bed unit, said first locking means comprising a draw bolt mounted on each corner housing and said selective mating locking means comprising a first eye member depending from the floor at each corner of said tent and bed unit for cooperation with one end of each draw bolt, and a second eye member projecting inwardly from the upper portion at each end of each of said drop side walls for cooperation with the other ends of said draw bolts, whereby release of the tent and bed unit for removal converts the first locking means to locking means for locking the drop side members in closed position for use of the trailer as a utility trailer; a leg for each corner of said trailer body and telescopic within the corner housing and cooperative with the corner portion of the tent and bed unit for maintaining transverse alignment between the trailer body and tent and bed unit, and clamping means at the lower end of the corner housing and cooperative with the leg for securing the leg in any extended or completely telescoped position.

3. A convertible utility trailer and camp tent comprising, a trailer body having a floor and fixed end walls, corner housings, drop side walls hinged at their lower ends to said floor, a tent and bed unit having a floor and end walls and side walls with the end walls supportable on the end walls of said trailer body, first locking means on each of said corner housings cooperative with selective mating locking means on said floor of said tent and bed unit and with mating locking means on the respective ends of said side walls of said trailer body, and individual locking means for each of said side walls of said trailer body and cooperative with individual mating locking means on the side walls of said tent and bed unit, said first locking means comprising a draw bolt mounted on each corner housing and said selective mating locking means comprising a first eye member depending from the floor at each corner of said tent and bed unit for cooperation with one end of each draw bolt, and a second eye member projecting inwardly from the upper portion at each end of each of said drop side walls for cooperation with the other ends of said draw bolts, whereby release of the tent and bed unit for removal converts the first locking means to locking means for locking the drop side members in closed position for use of the trailer as a utility trailer; a leg for each corner of said trailer body and telescopic within the corner housing, and clamping means for securing the leg in any extended or completely telescoped position and comprising a threaded member having an eye at one end with the threaded portion passing through the end wall of said housing, and a second similar threaded member passing through the side wall of said housing, and a chain having its respective ends connected to the respective eyes and cooperating with one side of the leg, and a nut for one of said threaded members and a wing nut for the other of said threaded members for manual tightening of the chain against the leg.

4. A utility trailer body having hinged drop sides, end walls, and a floor, a tent and bed unit mountable on said trailer body and supported solely on said end walls and having a bottom, selective locking means for locking said tent and bed unit at each corner to said trailer body, and locking said drop sides in closed position comprising a drawbolt mounted in said trailer body adjacent each corner, an eye depending from each corner of said bottom and mounted in cooperative relation to one end of said drawbolt, and a second eye projecting inwardly from each end of each hinged drop side and cooperative with the other end of the drawbolt, and individual key operated locking means cooperative between said tent and bed unit and each of said hinged drop sides.

References Cited in the file of this patent

UNITED STATES PATENTS

| 884,003 | Barton | Apr. 7, 1908 |
| 1,026,036 | Hewitt | May 14, 1912 |
| 2,383,192 | Heil | Aug. 21, 1945 |
| 2,513,411 | Heil | July 4, 1950 |
| 2,583,917 | Wiegant | Jan. 29, 1952 |